United States Patent [19]

Abe et al.

[11] Patent Number: 5,199,144
[45] Date of Patent: Apr. 6, 1993

[54] APPARATUS FOR AFFIXING COVERING MEMBER TO ARMREST BODY USED FOR AUTOMOTIVE SEAT

[75] Inventors: Yasuo Abe; Ayaru Sasaki, both of Tokyo, Japan

[73] Assignee: Tachi-S Co. Ltd., Tokyo, Japan

[21] Appl. No.: 708,045

[22] Filed: May 30, 1991

[51] Int. Cl.$^5$ .................................................. B23P 19/04
[52] U.S. Cl. ........................................ 29/235; 29/251; 29/281.3; 29/281.4; 29/281.5
[58] Field of Search ................... 29/235, 251, 281.1, 29/281.3, 281.4, 281.5; 100/214

[56] References Cited

U.S. PATENT DOCUMENTS

| | | | |
|---|---|---|---|
| 4,003,305 | 1/1977 | King | 29/251 |
| 4,162,601 | 7/1979 | Allen | 29/235 |
| 4,675,962 | 6/1987 | Tillner et al. | 29/235 |
| 4,677,810 | 7/1987 | Spano | 29/235 |
| 5,072,500 | 12/1991 | Wagner | 29/235 |

*Primary Examiner*—J. J. Swann
*Attorney, Agent, or Firm*—Oldham, Oldham & Wilson Co.

[57] ABSTRACT

An apparatus for affixing a covering member to a padding so as to produce an armrest body for use on an automotive seat, wherein an upper die assembly, on which is secured the padding, is provided in a vertical movable way, and a lower die assembly is provided under the upper die assembly, the lower die assembly including a pair of guide belts and a pair of support members which are so disposed as to surround a drive source. The covering member, which exposes its reverse surfaces, is placed on those two support members and guide belts, and undergoes its turning-over to expose its top surfaces, with insertion of the padding thereinto, so that the covering member is neatly affixed over the padding.

4 Claims, 4 Drawing Sheets

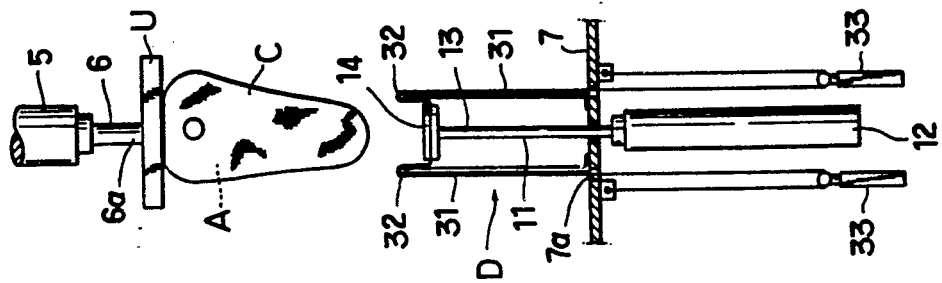
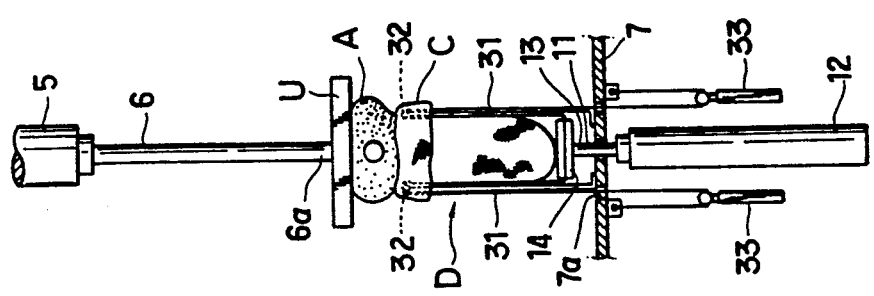
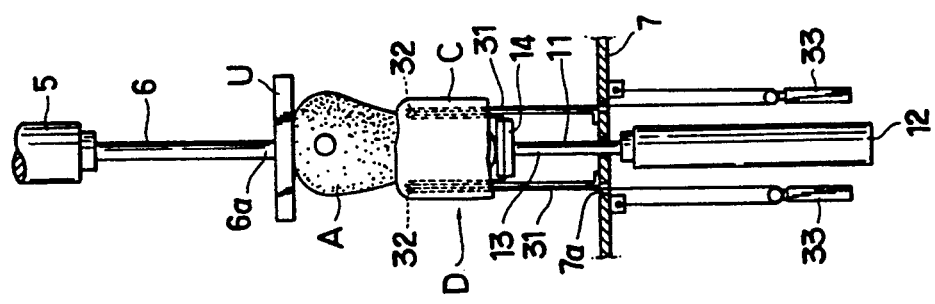
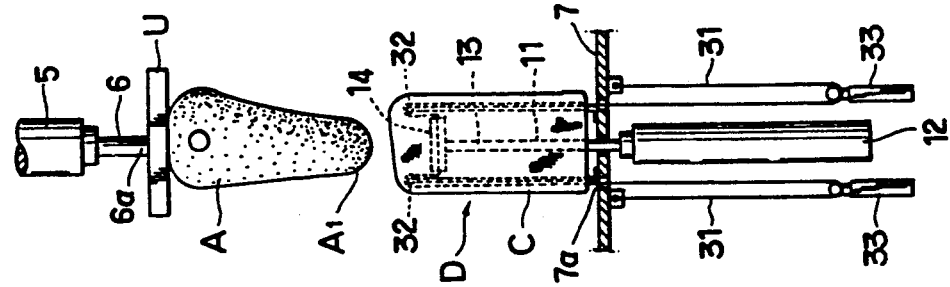

APPARATUS FOR AFFIXING COVERING MEMBER TO ARMREST BODY USED FOR AUTOMOTIVE SEAT

BACKGROUND OF THE INVENTION

1. Field of the Invention

The present invention relates to affixing of a covering member over an armrest body provided on an automotive seat, and in particular to an apparatus for affixing an armrest covering member of a one-side opened container shape to a foam armrest padding (a foam padding formed together with a frame therein), so as to produce an armrest for use on the automotive seat.

2. Description of Prior Art

Hitherto, an armrest body has been formed by way of a forcible pushing process, and an apparatus for such purpose has been provided, comprising a securing member on which an armrest covering member is secured, and a cylinder for forcibly inserting an armrest padding into such covering member.

However, the forcible insertion in such conventional apparatus causes creation of undesired wrinkles on the covering member and thus has been found defective in its inability to neatly stretch the covering member over the padding. One example of this sort includes the device disclosed in the Japanese Utility Model Laid-Open Pub. No. 63-38900, according to which, a foam padding is secured at an upper pushing member, then lowered by operation of a cylinder of the upper pushing member towards a turned-over covering member of one-side opened container shape which is placed on an opening of lower basket-like die, and the padding is forcibly inserted into the covering member, while the covering member is thereby being turned, with its downward movement into the lower die, to cover the padding therein. This however results in causing wrinkles on the covering member thus affixed to the padding.

SUMMARY OF THE INVENTION

In view of the foregoing, it is a purpose of the present invention to provide an improved apparatus for affixing a covering member to an armrest body for use on an automotive seat, which allows for affixing the covering member over a padding without wrinkles.

To achieve such purpose, according to the present invention, a pair of support members and a pair of guide belts are so arranged as to surround a drive source of lower die assembly, thereby defining a turret-like means for receiving a covering member that has been turned over to expose its reverse surfaces, while on the other hand an upper die assembly is provided over the lower die assembly, the upper die assembly being movable vertically relative to the lower one. Upon an upper die of the upper die assembly, a padding is secured. The guide belts extend vertically in the lower die assembly, with such an arrangement that each of the belts is at its upper end part folded about a rod provided on the top end of support member and extends therefrom downwardly, terminating in being connected to the drive source, and further the lower portion of guide belt is equipped with a weight.

Accordingly, the guide belts are normally kept to be stretched evenly due to the gravity of their respective weights, and when the padding on the upper die is lowered and inserted into a hollow defined by those paired support members and guide belts, the covering member that has been placed on such hollow is pressed by the padding thus lowered and turned over by the guiding of guide belts which are being hauled downwardly by the drive source. Thus, the covering member is turned over to bring its reverse surfaces in contact with the outer surfaces of padding evenly, with the top surfaces of covering member appearing upon the padding. The covering member is therefore affixed over the padding without undesired wrinkles.

BRIEF DESCRIPTION OF THE DRAWINGS

FIGS. 4 through 7 are explanatory views showing how the apparatus is worked;

DETAILED DESCRIPTION OF PREFERRED EMBODIMENT OF THE INVENTION

Referring to FIGS. 1 through 7, there is illustrated an apparatus for affixing an armrest covering member to an armrest padding, in accordance with the present invention.

Figure 1:
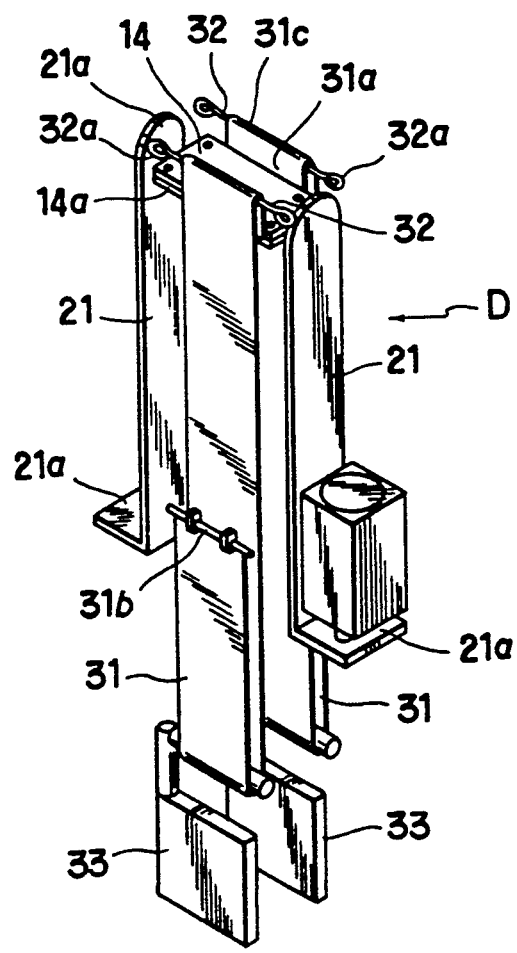
FIG. 1 is a schematic partially broken perspective view of a lower die assembly in the apparatus of the present invention.

FIG. 1 shows, generally, in perspective, the apparatus of the present invention, which includes a framework (4) for supportively mounting therein required elements and mechanisms to be described later. The framework (4) is comprised of a base frame (1), an upper frame (2), and four corner support frames (3) interposed between the base and upper frames (1) and (2).

Provided at the upper frame (2), is an upper die assembly composed of an upper die (U), a hydraulic cylinder (5) and a rod (6) of the cylinder (5) whose lower free end is fixed to the upper die (U). The upper die (U) extends downwardly from the upper frame (2) and is to be moved vertically by operation of the cylinder (5). Designation (U1) denotes a clamp equipped at each of both sides of the upper die (U), the clamp being for firmly retaining a foam padding (A) for its securing to the upper die (1). Using the clamp (U1), the padding (A) is at its base part secured to the surface of die (1) in a manner such that the padding (1) extends from the die (1) along a vertically longitudinal direction of the framework (4), with a view to directing the longitudinal axis of the padding (A) along a vertical line for alignment with a lower die assembly (D).

The lower die assembly (D), by referring to FIGS. 1, 2, 3 and 4, comprises a pair of support plate members (21)(21), a movable base support member (14) interposed between the two support plate members (21)(21), a drive source (11) for causing vertical movement of the base support member (14), a pair of guide belts (31)(31) and a pair of weights (33)(33).

Figure 2:
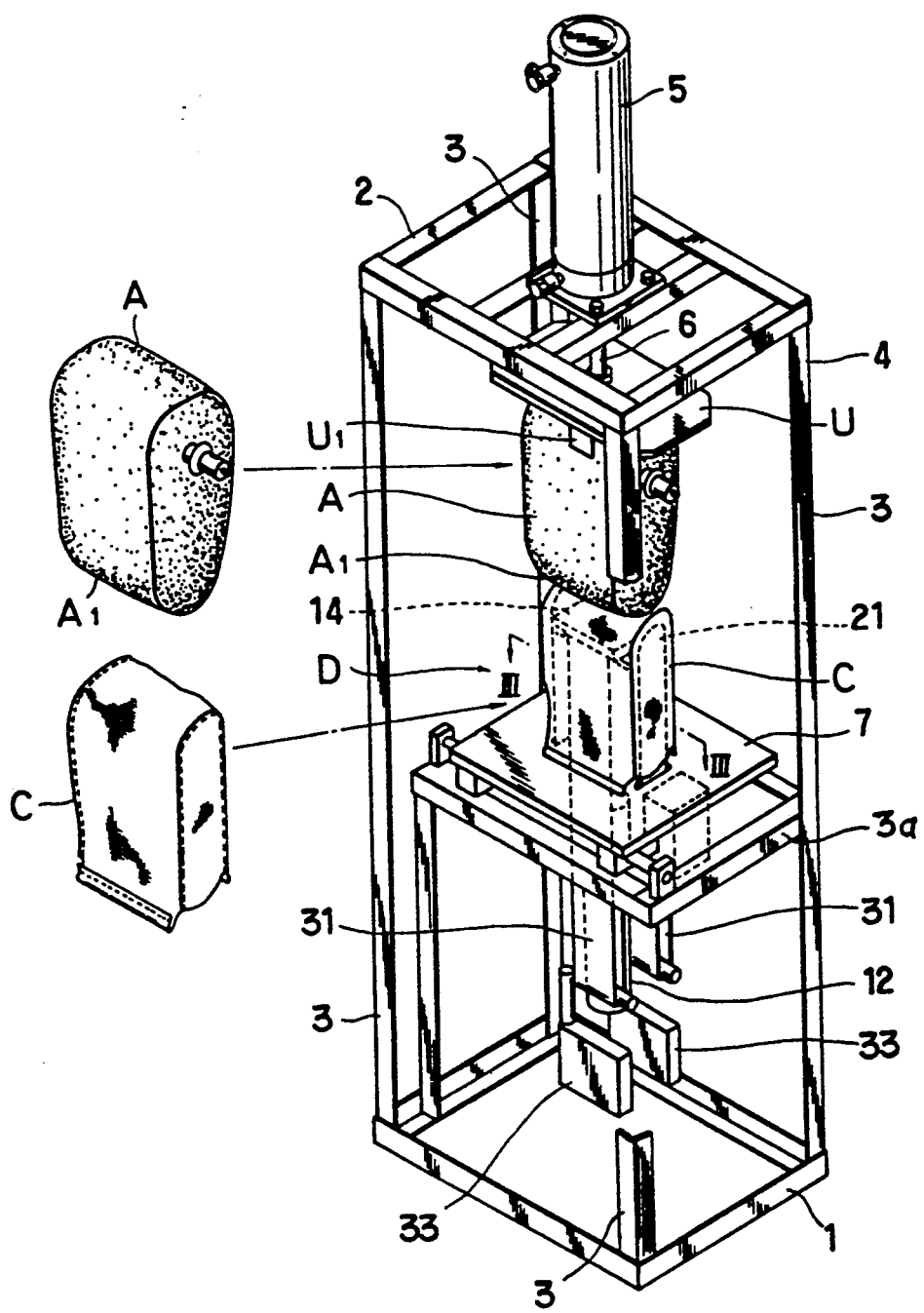
FIG. 2 is a schematic partially broken perspective view of the apparatus including the lower die assembly as in FIG. 1.

As viewed from FIGS. 1 and 2, the pair of support plate members (21)(21) are disposed on the right and left sides of the foregoing movable base support member (14) and the drive source (11), respectively. On the other hand, the pair of guide belts (31)(31) are disposed on the forward and rearward sides of the support member (14) and driver source (11). Hence, such base support member (14) and driver source (11) are surrounded by those two support plate members (21) and guide belts (31) at four angles, which can be more clearly viewed from FIG. 3.

The width between the two support plate members (21) is provided such as to permit insertion of both lateral walls of padding (A) therealong. Likewise, the width between the two guide belts (31) is provided such as to permit insertion of both fore-and-aft walls of padding (A). But, those two widths may be adjusted to allow any dimensions of padding thereinto, by employing a suitable adjustment device (not shown) to simply allow one or both members (21) and belts (31) to be adjusted to variable spaced parallel relationships to each other.

The support plate members (21)(21) are erected on a work plate (7) which is supported by intermediate frame (3a) provided within the framework (4). The frame (3a) is disposed between the upper and base frames (2)(1).

The guide belts (31)(31) are disposed in parallel with each other in a relation symmetrical relative to the support plate members (21). As best shown in FIG. 1, the arrangement of each guide belt (31) is such that the upper end part (31a) thereof is folded about a rod (32) in direction inwardly of the belt (31) and connected to one edge of movable base member (14), and that the body of belt (32) extends downwardly and is folded about a roller portion of weight (33), appearing outwardly thereof as opposed to the upper end part (31a), then extending in upward direction to terminate in a lower end part (31b). The lower end part (31b) is connected to the reverse surface of work plate (7), as seen in FIG. 4.

The two rods (32)(32) are at their respective both ends (32a) connected to the two top ends (21a) of support plate members (21). By virtue of the rods (32)(32), the movable member (14) is floated horizontally through the two guide belts (31)(31), between the two support plate members (21).

The two weights (33)(33) pull down the respective two guide belts (31)(31) in a downward direction, to thereby give a tension over the entire length of belts. The weights (33) may be directly connected to the lower end part (31b) of belt (31), instead the illustrated manner.

The drive source (11) comprises a hydraulic cylinder (12) having a rod (13), which is supported by the lower frame (1) or intermediate frame (3a), though not clearly shown. The rod (13) of cylinder (12) is fixed to the reverse side of the movable base member (14), as best seen from FIG. 4. Thus, operation of the cylinder (12) causes up-and-down movement of the movable base member (14).

Figure 3:
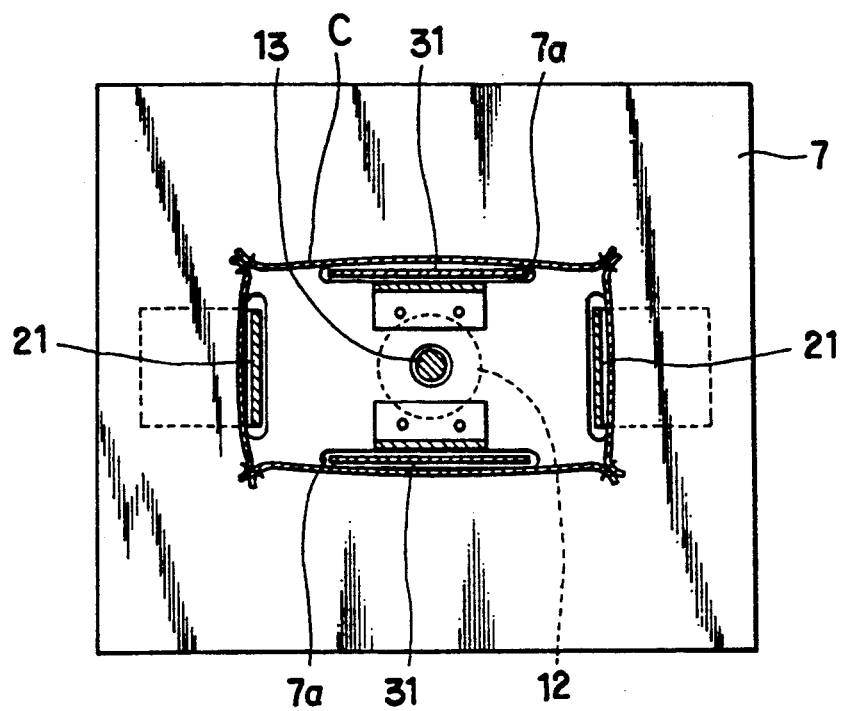
FIG. 3 is a partially sectional view taken along the line III—III in FIG. 1.

As in FIG. 3, a pair of opposed elongated holes (7a)(7a) are formed in the work plate (7), and through the holes (7a)(7a), there extends the guide belts (31)(31) respectively.

The foam padding, as designated by (A), is preformed by foaming together with a frame into a certain shape of armrest for used on an automotive seat.

Designation (C) denotes a covering member to be affixed over such foam padding. As shown, the covering member (C) is preformed by sewing together given separate cloth sections whose reverse surfaces are exposed outwardly. Thus, the covering member per se at this point is in the state of being turned upside down.

The foregoing paired set of support plate member (21) and guide belts (31), which project upwardly from the work plate (7), cooperate with the movable base member (14) to form a turret of rectangular parallelopiped shape, substantially, for receiving the covering member (C), which can be understood from FIG. 2 and 3, and constitute a major part of the lower die assembly (D).

In operating the upper cylinder by an operator actuation, for example, (5) to lower the padding (A) towards the covering member (C) placed on the foregoing lower die assembly (D), the contact of padding (A) with the movable base member (14) may actuate the lower cylinder (12) to lower that member (14) in synchronization with upper cylinder (5). This can effect a simultaneous lowering movement between the upper die (U) and movable base member (14), thus bringing the padding (A) bodily in downward direction without deformation, to achieve affixing of the covering member (C) over the padding (A). In this regard, (to achieve a synchronous movement of upper cylinder 5 and lower cylinder 12) a suitable electric circuit, control elements, and associated movable parts may be utilized, well known to the ordinary machine designer, (for example both member 14 and cylinder 5 would be the same size so that equal pressure application would cause both to move at the same speed.) and a pressure sensitive switch or sensor may be provided on the movable base member (14) for detecting the contact of the forward end (A1) of padding (A) with the movable base member (14).

Now, a description will be made of an operation of the above-described apparatus, with reference to FIGS. 4 though 7.

Firstly, as shown in FIG. 4, the foam padding (A) is secured at its base part to the upper die (U), while the covering member (C) is placed upon the above-stated turret-like projected portions of support plate member (21) and guide belts (31).

Then, the upper die (U) is lowered, by operation of the cylinder (5), to cause lowering of the padding (A) towards the covering member (C) on the lower die assembly (D).

When the forward end (A1) of padding (A) is brought to contact with the movable base member (14), the cylinder (12) is actuated to lower that member (14) in synchronization with the upper cylinder (5). Thus, the padding (A) is displaced downwardly in such a manner that it is sandwiched or retained between the upper die (U) and movable base member (14), without deformation. As seen from FIG. 5, the padding (A) is inserted together with the covering member (C) downwardly into a hollow defined in the aforesaid turret of support plate member (21) and guide belt (31), the hollow becoming greater in depth progressively with lowering of the member (14). Here, it is noted that such lowering of movable base member (14) also pulls down the respective upper end parts (31a) of guide belts (31), overcoming the gravity of the weights (33): In other words, both two guide belts (31) are moved upwardly by means of lower cylinder (12), such that lower belt portions of the belts (31) are pulled upwards, raising the weights (33), while the upper belt portions of same (31) are pulled downwards at the respective turning points (32).

In that way, the padding (A) is inserted in and circumscribed at its four wall surfaces by the pair of support plate members (21) and guide belts (31), and then, with further lowering of the movable base member (14), the upper belt sections of guide belts (31) are being hauled downwardly from their respective turning points (32), while being stretched evenly with a tension given by the corresponding two weights (33), whereby the covering member (C) in a pressed contact with those belts (31) is being forcibly turned over in cooperation with that insertion of padding (A), thereby exposing its top surface progressively, in contrast to its previous initial state of exposing the reverse surface. This can be seen from FIGS. 5 and 6.

When the movable base member (14) reaches the upper surface of work plate (7), the padding (A) is inserted in the covering member (C), completing the process.

Thereafter, the upper cylinder (5) is operated to raise the upper die (U) away from the lower die assembly (D), at which time, the lower cylinder (12) is simultaneously actuated through the above-mentioned automatic interlocking mechanisms (though not shown) to raise the movable base member (14) in synchronization with such lower one (12). As a result, as depicted in FIG. 7, the resultant armrest body is created. During this step, the upper surfaces of covering member (C) thus superposed on the padding (A) undergoes an even stretch by hauling-back of the guide belts (31), to thereby eliminate wrinkles on the upper surfaces of covering member (C). Namely, with the upward movement of base member (14) in this particular last step, the guide belts (31) are entirely pulled down due to the weights (33), which in turn causes the upper belt sections of belts (31) to be hauled back to run towards the respective turning points (32), the upper belt sections of belts (31) having been in contact with the foregoing outwardly exposed top surfaces of covering member (C). Consequently, the top surfaces of covering member (C) are stretched evenly by thus-hauled-back upper belt sections of belts (31).

Figure 8:
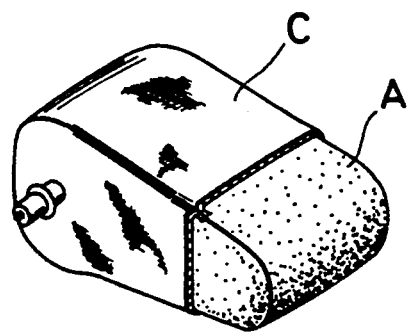
FIG. 8 is a partly broken perspective of a resulting armrest body produced by the apparatus in accordance with the invention.

At completion of above-stated steps, the clamps (U1) are released and the resultant armrest body is taken out from the upper die (U), whereupon there is obtained an armrest body as illustrated in FIG. 8.

From the descriptions above, it is to be appreciated that the covering member (C) is affixed over the padding (A) by way of being at their four lateral walls firmly embraced by those paired support plate members (21) and guide belts (31), thus effectively aiding in completely affixing the covering member (C) over the padding (A), without creation of undesired wrinkles on the covering member (C). Hence, according to the present invention, an armrest body of aesthetically excellent appearance can be produced. In addition, there is no need to again turn upside down the initially turned-over covering member (C) after the assemblage, for the turned-over covering member (C) whose reverse surfaces are exposed outwardly is placed on the lower die assembly (D) and then pressed by the padding (A) so as to be turned over automatically, as stated above, thereby naturally exposing its top surfaces.

It should be understood that the present invention is not limited to the illustrated embodiment, but any other modifications, replacements and additions may structurally be possible without departing from the scope and spirit of the appended claims. For instance, the guide belts (31) may be altered to a pair of endless belts, with a view to making more simplified the belt guide structure. Contrary to the embodiment shown, the pair of guide belts (31) may be disposed forwardly and backwardly relative to the drive source (11) whereas the pair of support plate members (21) may be disposed on the right and left sides relative thereto.

What is claimed is:

1. An apparatus for affixing a covering member to a padding in order to produce an armrest body for an automotive seat, in which said covering member is formed in a shaped of one-side opened container and said padding is formed in a given configuration of said armrest body, said apparatus comprising:
   a lower die means upon which is placed said covering member; and
   an upper die means upon which is secured said padding, said upper die means being disposed above said lower die means and including an upper die body and a drive means for causing said upper die body to be moved vertically towards and away from said lower die means:
   said lower die means including:
      a movable base member;
      a drive means for causing vertical movement of said movable base member in a synchronous relation with said vertical movement of said upper die body, so that both said upper and lower die bodies are moved together at the same speed and in the same direction;
      a pair of support members, each being disposed on respective first opposite sides of said drive means;
      a pair of guide belts, each being disposed on respective second opposite sides of said drive means, said second opposite sides being situated at points excepting said first opposite sides;
      wherein said support members and guide belts surround said drive means of said lower die means and movable base member, said support members and guide belts cooperating with one another at their respective upper portions to define a means for receiving said covering member which is turned over to expose its reverse surfaces;
      a rod means provided above and extended between said pair of support members;
      the arrangement of said pair of guide belts being such that each of them is at its upper portion folded about said rod means, extending downwardly, and further connected with said lower die drive means via said movable base member, and that each of said guide belts is equipped with a tension providing means, to thereby cause the guide belt to be stretched evenly;
   whereby operation of said upper die means drive means causes said padding secured at said upper die means to be moved downwardly, thereby inserting said padding into a hollow defined within said pair of support members and guide belts, and with such padding insertion, said movable base member is lowered simultaneously by said lower die means drive means, which in turn causes said guide belts to be hauled downwardly, thereby turning over said covering member neatly to bring its reverse surfaces in contact with the outer surfaces of said padding, so as to affix said covering member over said padding, with top surfaces of said covering member appearing on said padding.

2. The apparatus according to claim 1, wherein said drive means of both said upper and lower die means comprises a hydraulic cylinder having a rod.

3. The apparatus according to claim 1, wherein said tension providing means comprises a pair of weights, and wherein said pair of weights are each attached to respective lower belt section of said two guide belts, whereby said guide belts are kept to be stretched evenly in a vertical direction.

4. The apparatus according to claim 1, wherein between said upper and lower die means, there is interposed a work plate, upon which said pair of support members are fixedly mounted, wherein said pair of guide belts and said lower die drive means pass movably through said work plate, and wherein, at an upper surface of said work plate, upper portions of said support members and guide belts project and cooperate with one another to define said means for receiving said covering member, whereas under said work plate, lower portions of said guide extend straight in downward direction and are each folded about said tension providing means, then extending upwardly to be connected to a reverse side of said work plate.

* * * * *